UNITED STATES PATENT OFFICE.

AUGUSTUS E. CRAVER, OF CLIFFSIDE, NEW JERSEY.

ADHESIVE WATERPROOFING AND SIZING COMPOSITION.

1,373,412.　　　　　Specification of Letters Patent.　　Patented Apr. 5, 1921.

No Drawing.　　　Application filed June 8, 1920. Serial No. 387,383.

*To all whom it may concern:*

Be it known that I, AUGUSTUS E. CRAVER, a citizen of the United States, residing at Cliffside, in the county of Bergen and State of New Jersey, have invented certain new and useful Improvements in Adhesive Waterproofing and Sizing Compositions of which the following is a specification.

This invention relates to a method of treating animal and vegetable proteids and other compounds, and to the product thereby obtained.

An object of the invention is to produce a composition of matter that may be used as an adhesive composition, glue, insoluble coating, sizing, etc. Materials that may be used in accordance with this invention to produce this composition include, for example, all albumins, gelatin, casein, glue, hide, gluten, starch, dextrin, gums and similar compounds.

Another object of the invention is to improve the quality of the composition especially with respect to regulating its setting and hardening qualities and rendering it more water-proof and moisture-proof and making it less liable to deteriorate.

In carrying out my invention, I treat the proteid or other material or mixture of these substances with a solvent. As a specific example, I may treat casein with any of the well-known solvents for this material, such as the aqueous solutions of the caustic alkalis, the normal and acid carbonates of the alkali metals and alkaline earth metals, the alkaline earth oxids, sodium silicate, borax, etc., by which means a caseinate of the corresponding metal is largely formed together with some undissociated casein which appears to be in a sort of colloidal suspension. These solvents may be dissolved in or mixed with a suitable quantity of water and reduced to the form of a liquid or semi-liquid condition to be used for dissolving the casein or other proteid. Mixtures of these solvents are also desirable in some cases and the proportion of solvent to the basic adhesive material can be varied over very wide limits depending on the use to which the resulting mixture is to be put.

By the use of the solvent, the basic glue or sizing material or materials may be thus reduced to different degrees of molecular distribution of the one substance in the other, being either in the form of mechanical suspensions, colloid solutions, or molecular solutions or mixtures of these. In the specification and claims the term "solution" is intended to be broad enough to cover any or all of these states or phases and the term "solvent" is intended to be broad enough to cover all substances which will produce any or all of these states or phases.

To the solution or mixture thus obtained is added a compound or compounds, which by reason of the chemical nature of the substance or substances thus added, will, on long standing, or by the application of external heat or otherwise, liberate formaldehyde which will then react chemically with the proteid or other constituent of the composition, converting it into an insoluble compound, thus rendering the composition water-proof, moisture-proof and incidentally decay-proof. The choice of the basic glue, adhesive, sizing, etc., making material or materials of the composition will, of course, depend on their ability to react with formaldehyde to form insoluble compounds, and the choice of the substances to be added to the solution or mixture will be determined by their ability to liberate formaldehyde at the proper time and under proper conditions Among many compounds suitable for this purpose, I have found sodium formaldehyde sulfoxylate $(H_2C{<}{}^{OH}_{OSO_2}Na)$, to give satisfactory results. In addition to the sodium salt, the other corresponding metallic salts, such as the zinc and calcium salts, have been tried and found successful. Compounds related to those enumerated above, namely formaldehyde sodium bisulfite $(H_2C{<}{}^{OH}_{OSO_3}Na)$ and the corresponding metallic salts and also, in particular, the compound $C_4H_8S_3O$ have been tried and found satisfactory.

The following is given as a further specific example illustrative of my invention in which casein is used as the basic adhesive or sizing material: About 20 parts of casein are mixed with 2 parts calcium oxid, 20 parts 40°B. sodium silicate solution, 125 parts water and 8 parts sodium formaldehyde sulfoxylate or a formaldehyde liberating compound or compounds which will liberate a quantity of formaldehyde equal to about 8% by weight of the casein employed. I do not wish to limit myself to these above solvents nor to their respective amounts and when I say casein, I have reference to all proteids of animal and plant origin as well as starch, dextrin, gums and similar substances; mixtures of these compounds are sometimes employed depending on the intended use of the finished composition.

The composition containing the proteid, the formaldehyde producing compound, and solvent may then be applied for cementing wood, paper, etc., together or for coating purposes, or otherwise, the formaldehyde as it is liberated reacts upon the proteid component to render it insoluble, thus making it waterproof. It has been found that formaldehyde will not be liberated from sodium formaldehydesulfoxylate until the temperature is raised above 100° C so that the composition may be permitted to dry, if desired, after it is applied and the temperature may then be raised to the proper point to cause the formaldehyde to be liberated, and react upon the proteid to render it insoluble.

I have found also that the liberation of formaldehyde is aided by admixing other compounds with the formaldehyde liberating compounds previously mentioned. Oxidizing agents in general such as copper sulfate and hydrogen peroxid for example have been found to be suitable for this purpose, and may be added, if desired, just before the composition of matter is applied where it is to become set and hardened.

I have herein mentioned a few compounds which can be used singly or in combination or admixed with other suitable compounds which will aid in the liberation of formaldehyde at the proper time and have also presented an example, but I do not wish to be limited to these, as they are intended to serve only as illustrations of the means which I employ for liberating formaldehyde in the composition when the latter is employed as an adhesive compound, glue, insoluble coating, sizing and the like.

It is to be understood that in making this composition of matter the ingredients constituting the composition can be either compounded dry and the mixture then mixed with the proper amount of aqueous solvent, or they can be mixed singly and directly with the solvent.

I claim:

1. A composition of matter, comprising a proteid, an aqueous solvent therefor, and a formaldehyde liberating substance.

2. A composition of matter, comprising a proteid, an aqueous alkaline solvent therefor, and a formaldehyde liberating substance.

3. A composition of matter, comprising a proteid, an aqueous caustic alkali solvent therefor, and a formaldehyde liberating substance.

4. A composition of matter, comprising a casein, a solvent therefor, and a formaldehyde liberating substance.

5. A composition of matter, comprising a casein, an alkaline solvent therefor, and a formaldehyde liberating substance.

6. A composition of matter, comprising a casein, a caustic alkali solvent therefor, and a formaldehyde liberating substance.

7. A composition of matter, comprising a proteid, water and a substance capable of liberating formaldehyde.

8. A composition of matter, comprising a proteid, an aqueous solvent therefor, and a substance capable of liberating formaldehyde upon the application of heat.

9. A composition of matter, comprising a casein, a solvent therefor, and a substance capable of liberating formaldehyde upon the application of heat.

10. A composition of matter, comprising a proteid, a non-aqueous solvent therefor, water, and a formaldehyde liberating substance.

11. A composition of matter, comprising a proteid, a solvent therefor, and a formaldehydesulfoxylate.

12. A composition of matter, comprising a proteid, a solvent therefor, a formaldehydesulfoxylate, and an oxidizing agent.

13. A composition of matter, comprising a proteid, a solvent therefor, and sodium formaldehydesulfoxylate.

14. A composition of matter, comprising a casein, a slovent therefor, and sodium formaldehydesulfoxylate.

15. A composition of matter consisting of approximately 20 parts of casein, 147 parts of a solvent therefor, and such a quantity of a formaldehyde liberating substance as will liberate a quantity of formaldehyde equal to approximately 8% by weight of the casein employed.

16. The herein described process which comprises mixing a proteid and water with a substance capable of liberating formaldehyde.

17. The herein described process which comprises mixing a proteid and a solvent therefor with a substance capable of liberating formaldehyde upon the application of heat, and heating said mixture.

18. The herein described process which comprises treating a proteid with a solvent, adding a formaldehyde liberating substance, and causing formaldehyde to be liberated and react upon said proteid.

19. The herein described process which comprises treating a proteid with a solvent, adding a formaldehyde liberating substance, applying the mixture to a surface and heating it.

In testimony whereof I affix my signature.

AUGUSTUS E. CRAVER.